US012104564B2

(12) United States Patent
Graumüller

(10) Patent No.: US 12,104,564 B2
(45) Date of Patent: Oct. 1, 2024

(54) HIGH PRESSURE FUEL PUMP LUBRICATION METHOD AND APPARATUS

(71) Applicant: Caterpillar Motoren GmbH & Co. KG, Kiel (DE)

(72) Inventor: Robert Graumüller, Kiel (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 0 days.

(21) Appl. No.: 18/278,330

(22) PCT Filed: Mar. 11, 2022

(86) PCT No.: PCT/EP2022/025101
§ 371 (c)(1),
(2) Date: Aug. 22, 2023

(87) PCT Pub. No.: WO2022/194424
PCT Pub. Date: Sep. 22, 2022

(65) Prior Publication Data

US 2024/0133356 A1 Apr. 25, 2024
US 2024/0229754 A9 Jul. 11, 2024

(30) Foreign Application Priority Data

Mar. 18, 2021 (GB) ..................................... 2103786

(51) Int. Cl.
*F02M 63/00* (2006.01)
*F02M 59/10* (2006.01)
*F02M 59/36* (2006.01)

(52) U.S. Cl.
CPC ...... *F02M 63/0001* (2013.01); *F02M 59/102* (2013.01); *F02M 59/36* (2013.01)

(58) Field of Classification Search
CPC ... F02M 63/0001; F02M 63/102; F02M 63/36
(Continued)

(56) References Cited

U.S. PATENT DOCUMENTS 4,445,470 A * 5/1984 Chmielewski ......... F01M 11/10
123/73 AD
4,572,120 A 2/1986 Matsumoto
(Continued)

FOREIGN PATENT DOCUMENTS

DE 102011089399 A1 6/2013
KR 20150144942 A 12/2015
(Continued)

OTHER PUBLICATIONS

KR-101586993-B1 (Jan. 22, 2016) (Machine Translation) (Year: 2016).*
(Continued)

*Primary Examiner* — Mahmoud Gimie

(57) ABSTRACT

A lubricated high pressure fuel pump assembly is provided, comprising a fuel pump, a sealed enclosure and a pump lubrication circuit. The fuel pump includes a pump drive shaft via which the fuel pump is configured to be mechanically driven. The sealed enclosure is configured to surround a first portion of the pump drive shaft, wherein the first portion is exterior to the fuel pump. The pump lubrication circuit comprises a lubricant reservoir and a lubricant pump configured to pump lubricant from the lubricant reservoir to the pump drive shaft. The sealed enclosure is configured to prevent fluid leakage from the fuel pump via the first portion of the pump drive shaft and the lubricant reservoir is configured to collect the lubricant from the pump drive shaft, such that the lubricant is retained within the lubricated high pressure fuel pump assembly.

15 Claims, 8 Drawing Sheets

(58) Field of Classification Search
USPC ...................................................... 123/196 R
See application file for complete search history.

(56) References Cited

U.S. PATENT DOCUMENTS

| | | | |
|---|---|---|---|
| 5,701,872 | A | 12/1997 | Kaku et al. |
| 5,870,991 | A | 2/1999 | Mineno |
| 6,112,726 | A | 9/2000 | Saito et al. |
| 6,502,666 | B2 | 1/2003 | Takada et al. |
| 9,683,517 | B2 | 6/2017 | Kim et al. |
| 2003/0145835 | A1 | 8/2003 | Djordjevic |
| 2009/0114190 | A1 | 5/2009 | Shafer et al. |
| 2014/0034018 | A1 | 2/2014 | Christopher et al. |

FOREIGN PATENT DOCUMENTS

| | | | |
|---|---|---|---|
| KR | 101586993 | B1 * | 1/2016 |
| WO | 2012171593 | A1 | 12/2012 |

OTHER PUBLICATIONS

International Search Report related to Application No. PCT/EP2022/025101; reported on Jun. 29, 2022.
Great Britain Search Report related to Application No. 2103786.6; reported on Nov. 22, 2021.
Great Britian examination report related to Application No. 2103786.6, mailed Jun. 11, 2024 (4 pgs).

* cited by examiner

HIGH PRESSURE FUEL PUMP LUBRICATION METHOD AND APPARATUS

CROSS-REFERENCE TO RELATED APPLICATION

This Application is a 35 USC 8371 US National Stage filing of International Application No. PCT/EP2022/025101 filed on Mar. 11, 2022 which claims priority under the Paris Convention to Great Britain Patent Application No. 2103786.6 filed on Mar. 18, 2021.

FIELD OF THE DISCLOSURE

The disclosure relates to the field of high pressure fuel pumps lubricated by a lubricant other than fuel, particularly for use with internal combustion engines.

BACKGROUND

Internal combustion engines require fuel to be injected at high pressure. It is known to provide a high pressure pump to increase fuel pressure for this purpose. It is also known to provide a pump lubricant circuit to facilitate efficient operation of such high pressure pumps.

High pressure pumps, such as reciprocating pumps with pistons or plungers, can facilitate migration of fuel between, for example, the piston and the piston bore. In this way, fuel may contaminate the pump lubricant. Depending on the fuel being used, contamination of the lubricant with fuel may reduce the lubricating qualities of the lubricant.

In the case of diesel fuel, the impact of a modest quantity of diesel contaminating the lubricant may be relatively minor because diesel itself has reasonable lubricating qualities.

Methanol is an alternative fuel to diesel that is of interest for use with combustion engines, for example in marine propulsion. For example, ship engines that are around 2-9 MW and that conventionally use diesel could be adapted to use methanol. Methanol has around half the heating value of diesel, and so double the injection volume is needed. It is convenient for such industries to use engines similar to existing diesel engines or to modify diesel engines such that they can use methanol (or alternative low flash point fuels), particularly given that the same air system can be used. Barriers to using methanol include its very low viscosity and the fact that it is a polar liquid, leading to risks of fuel migration and of corrosion. It is preferable to avoid mixing of methanol with lubricant in a high pressure fuel pump and to prevent any leakage of diluted lubricant to the engine's lubrication circuit.

The requirement for a larger volume of Methanol than diesel means that a higher pressure may be required, meaning that the fuel pump needs to operate at higher pressures. A higher pressure may increase the risk of fuel migrating into the pump lubricant. Furthermore, since the lubricating qualities of Methanol are poor, the impact of such contamination may be significantly more severe.

In short, relative to diesel, the risk and consequences of fuel migration are increased for fuels such as Methanol (and other low flash point fuels) which have very low viscosity and no lubricating qualities.

SUMMARY OF THE DISCLOSURE

Against this background, there is provided a lubricated high pressure fuel pump assembly comprising:

- a fuel pump including a pump drive shaft via which the fuel pump is configured to be mechanically driven;
- a sealed enclosure configured to surround a first portion of the pump drive shaft, wherein the first portion is exterior to the fuel pump;
- and a pump lubrication circuit comprising:
  - a lubricant reservoir; and
  - a lubricant pump configured to pump lubricant from the lubricant reservoir to the pump drive shaft;

wherein:

- the sealed enclosure is configured to prevent fluid leakage from the fuel pump via the first portion of the pump drive shaft; and
- the lubricant reservoir is configured to collect the lubricant from the pump drive shaft;

such that the lubricant is retained within the lubricated high pressure fuel pump assembly In this way the high pressure fuel pump may be lubricated with lubrication oil with minimal risk of lubricant mixing with the fuel or leaking to the engine lubricant supply.

A lubricated high pressure fuel pump assembly comprising a fuel pump and a lubrication circuit, wherein the fuel pump comprises:

- a pump drive shaft having a first end via which the fuel pump is configured to be mechanically driven;
- a dry mechanical coupling at the first end of the pump drive shaft for connection to an engine shaft; and
- a sealed enclosure configured to surround: the first end of the pump drive shaft; the mechanical coupling; and, in use, the engine shaft;

and wherein the lubrication circuit comprises:

- a lubricant reservoir; and
- a lubricant pump configured to pump lubricant from the lubricant reservoir to the pump drive shaft;

wherein:

- the dry mechanical coupling is configured to prevent fluid transfer between the first end of the pump drive shaft and the dry mechanical coupling; and
- the lubricant reservoir is configured to collect the lubricant from the pump drive shaft;

such that the lubricant is retained within the lubricated high pressure fuel pump assembly.

BRIEF DESCRIPTION OF THE DRAWINGS

A specific embodiment of the disclosure will now be described, by way of example only, with reference to the accompanying drawings in which.

DETAILED DESCRIPTION

According to an embodiment of this disclosure, there is a lubricated high pressure fuel pump assembly 10. There is a pump lubrication circuit 200 for lubricating the drive shaft and plunger drive mechanism of the high pressure fuel pump 100 that is configured to prevent lubricant from reaching an engine or mixing with engine lubricant. The fuel may be a low flash point fuel. In an embodiment, the fuel may be methanol. In alternative embodiments the fuel may be dimethyl ether, ethane, ethanol or ammonia.

Figure 1:
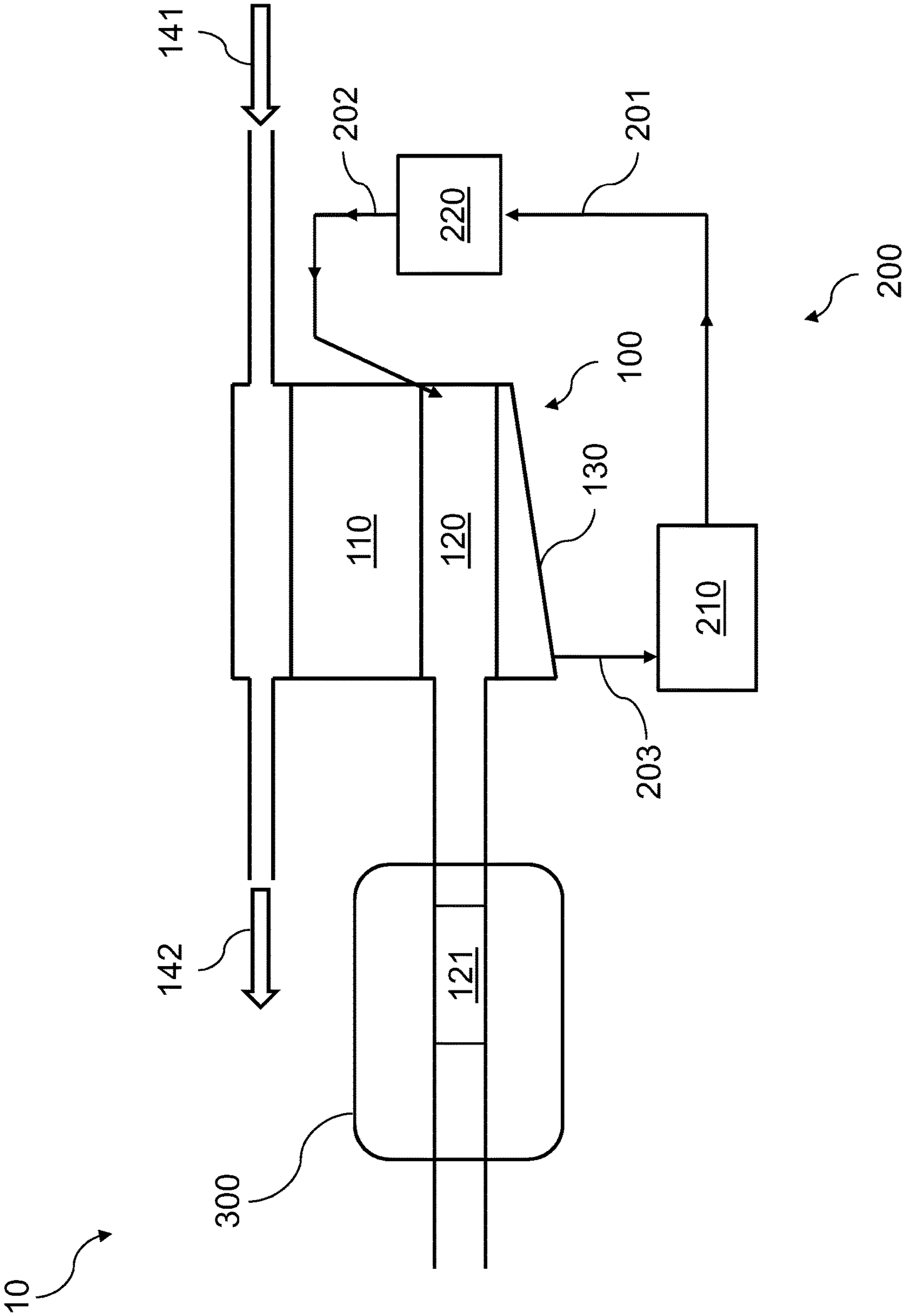
FIG. 1 shows a schematic of a high pressure fuel pump and pump lubrication circuit in accordance with an embodiment of the disclosure.

With reference to FIG. 1, there is a high pressure fuel pump 100 that is configured to increase the pressure of fuel prior to injection into an engine's combustion chamber. Low pressure fuel enters the fuel pump 100 via a low pressure fuel inlet 141, and fuel pumping section 110 increases the pressure of the fuel such that high pressure fuel leaves the fuel pump 100 via a high pressure fuel outlet 142. The fuel pumping section 110 is configured to be mechanically driven via a pump drive shaft 120. The fuel pump 100 may be a reciprocal pump, in which a plunger drive mechanism converts the rotation of the pump drive shaft 120 to translational motion of plungers in the fuel pumping section 110.

The pump drive shaft 120 requires lubrication, and is sensitive to the detrimental effects of diluted lubricant. The pump drive shaft 120 is lubricated via a pump lubrication circuit 200 that is configured to prevent the lubricant and fuel mixing, and to prevent lubricant from leaking to the engine. The pump lubrication circuit 200 comprises a lubricant reservoir 210, from which lubricant pump 220 receives lubricant (as indicated by arrow 201). The lubricant pump 220 pumps lubricant to the pump drive shaft 120 (as indicated by arrow 202). The lubricant is collected and returned to the lubricant reservoir 210 via lubricant outlet 130 (as indicated by arrow 203).

Figure 2:
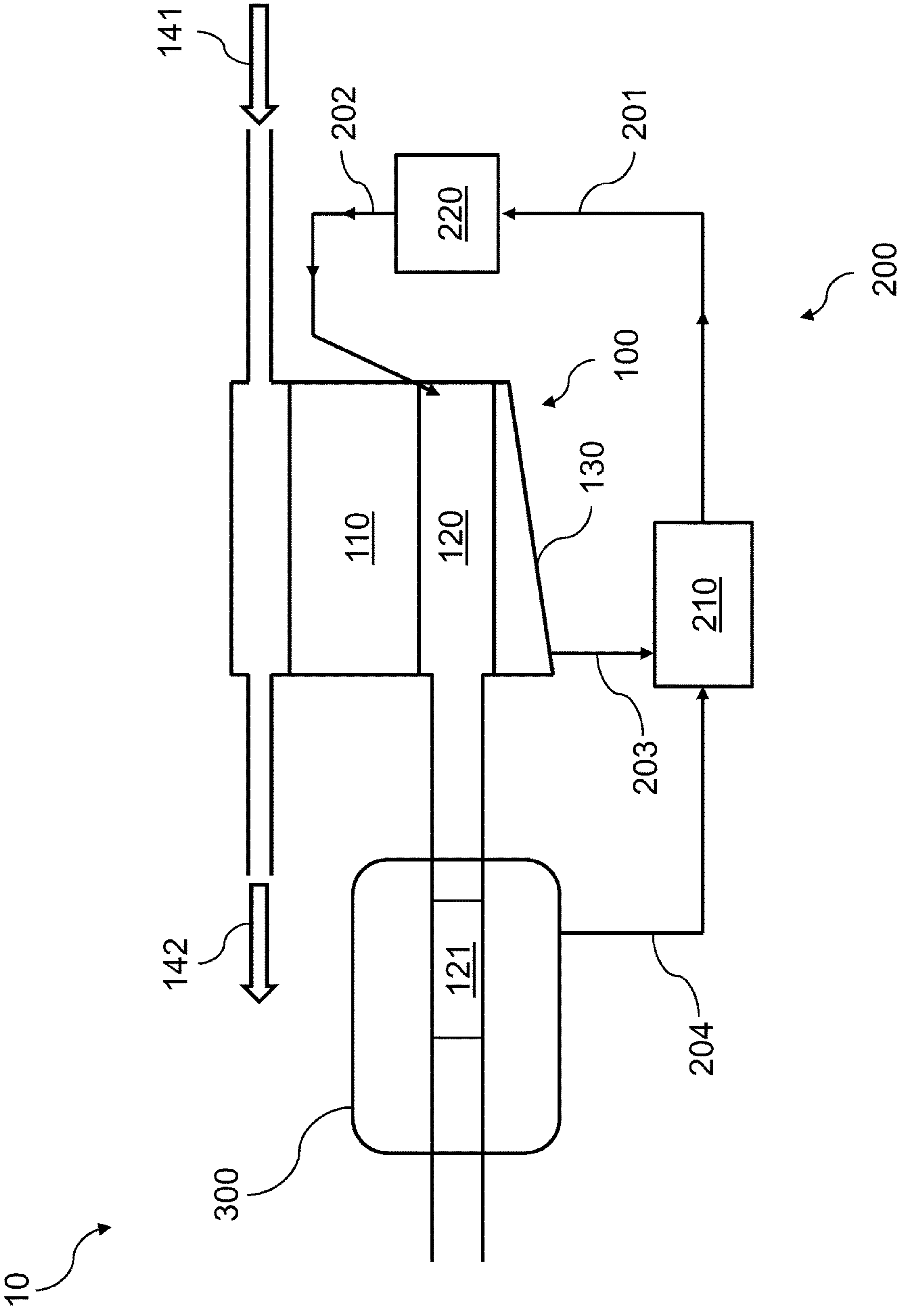
FIG. 2 shows a schematic of a high pressure fuel pump and pump lubrication circuit, further comprising a drain from the sealed enclosure, in accordance with an embodiment of the disclosure.

A first portion 121 of the pump drive shaft 120 that is exterior to the fuel pump 100 is enclosed by a sealed enclosure 300. The sealed enclosure 300 is configured to prevent lubricant from leaking from the fuel pump 100 and associated pump lubrication circuit 200 via the pump drive shaft 120 to the environment. In an embodiment, the sealed enclosure 300 may be dry. In another embodiment, with reference to FIG. 2, the sealed enclosure 300 may comprise a drain that is configured to transfer any fluid in the sealed enclosure 300 to the lubricant reservoir 210 (arrow 204). The sealed enclosure 300 may be further configured to monitor fluid within it. Entry of liquid into the sealed enclosure 300 may be monitored by an appropriate sensor, such as a liquid sensor or a pressure sensor, as a measure of leakage detection. In the case of leakage, a failure mode may be triggered.

Figure 3:
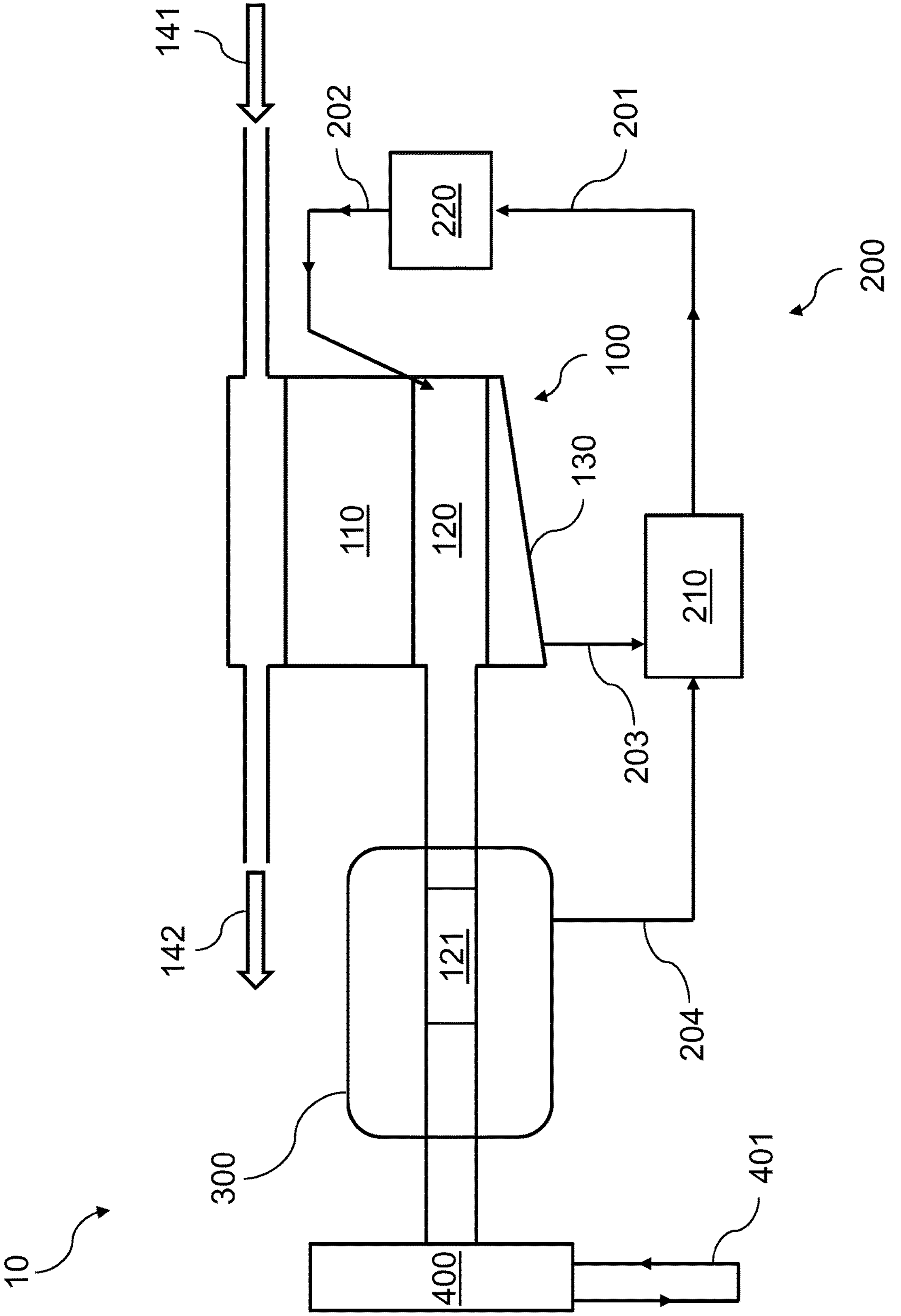
FIG. 3 shows a schematic of a high pressure fuel pump and pump lubrication circuit wherein the fuel pump is mechanically driven by an engine, in accordance with an embodiment of the disclosure.

With reference to FIG. 3, the pump drive shaft 120 is configured such that in use, it may be mechanically driven by an engine 400. The sealed enclosure 300 thus prevents lubricant passing from the fuel pump 100 to the engine 400. The engine 400 may comprise an engine lubrication circuit 401.

Figure 4:
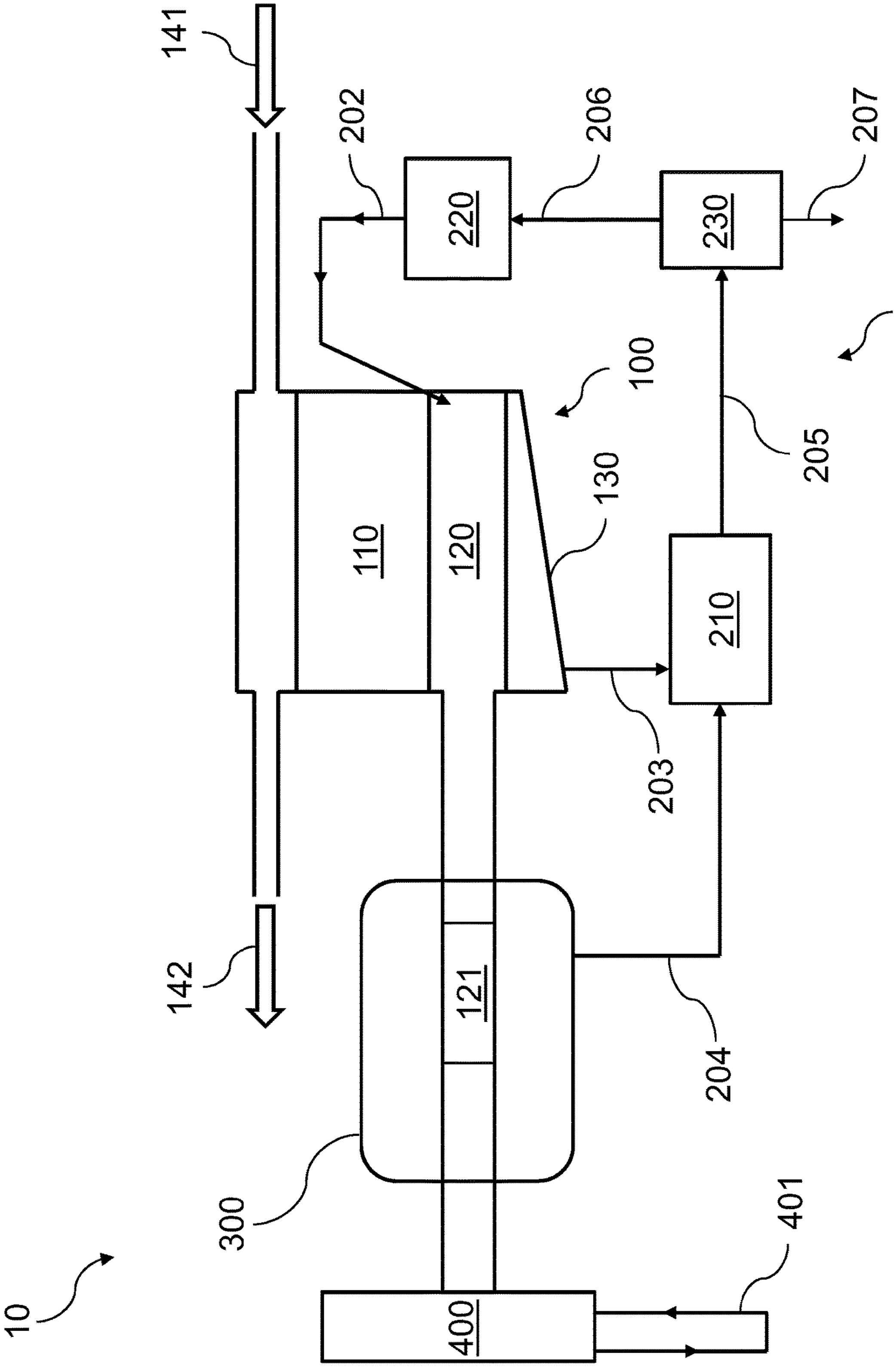
FIG. 4 shows a schematic of a high pressure fuel pump and pump lubrication circuit further comprising a fluid separator, in accordance with an embodiment of the disclosure.

With reference to FIG. 4, in an embodiment the pump lubrication circuit 200 may further comprise a fluid separator 230 that is configured to isolate lubricant from a contaminated mixture of lubricant and fuel, to facilitate removal of fuel that may be present in the pump lubrication circuit. The lubricant reservoir 210 may receive lubricant from the lubricant outlet 130 of the fuel pump 100 and from the sealed enclosure 300. There is a risk that this lubricant may have been mixed with some fuel. It is preferable that the pump drive shaft 120 is lubricated by lubricant only, rather than lubricant that is diluted by fuel, and so the fluid separator 230 may be used to purify the lubricant that is output from the lubricant reservoir 210. The fluid separator 230 may receive fluid from the lubricant reservoir 210 (arrow 205), and separate said fluid into lubricant and contaminates such as fuel. The lubricant is transferred (via arrow 206) to the lubricant pump 220 and any contaminates are collected (arrow 207). In an embodiment, the fuel may be methanol. Methanol has low viscosity and is polar, whereas the lubricant may have high viscosity and be non-polar. The fluid separator 230 may separate the methanol and lubricant based on these properties or via density.

Figure 5:
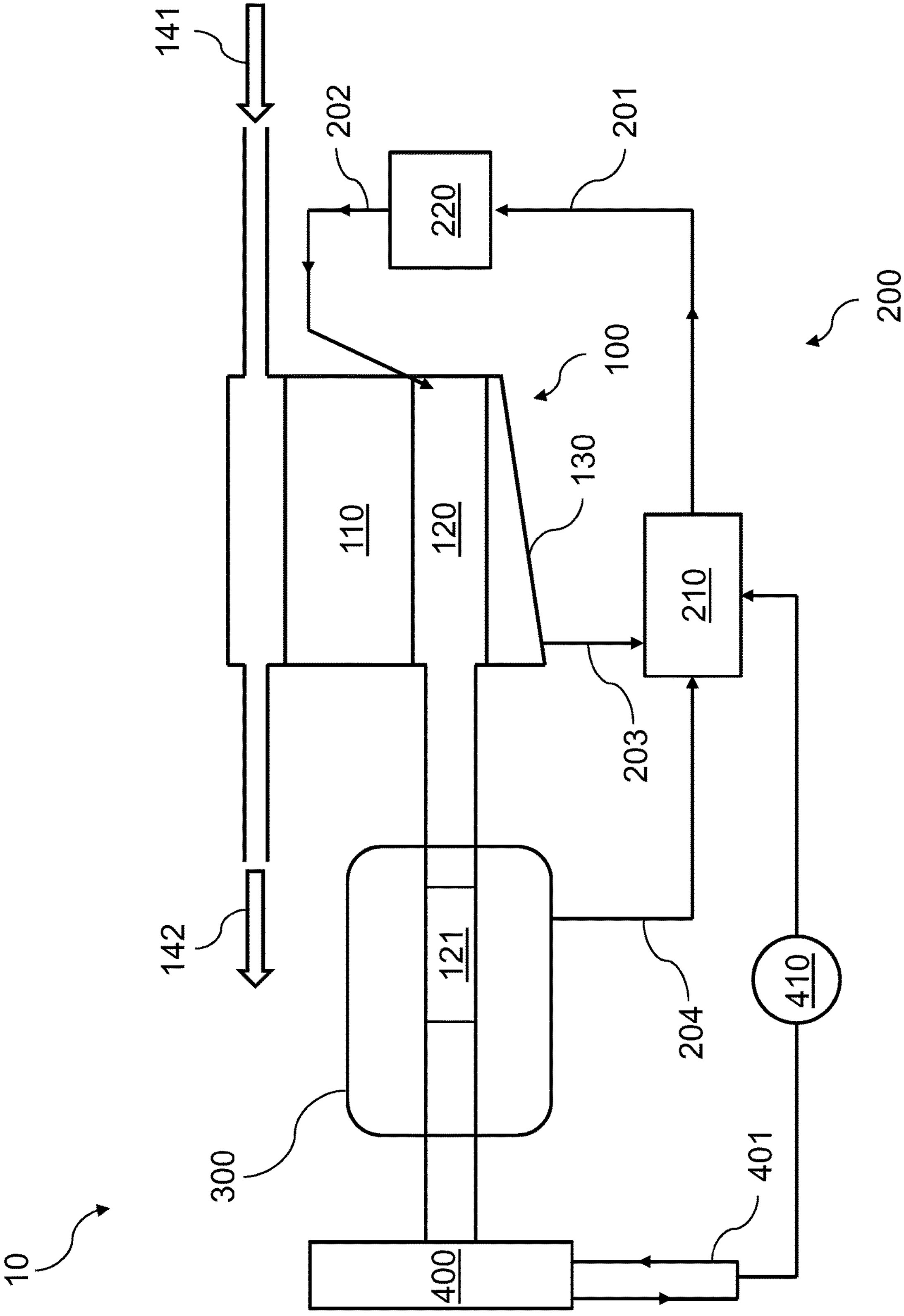
FIG. 5 shows a schematic of a high pressure fuel pump and pump lubrication circuit wherein the lubrication reservoir receives lubricant from the engine lubricant supply, in accordance with an embodiment of the disclosure.

In another embodiment, with reference to FIG. 5, the lubricant reservoir 210 may additionally receive lubricant from an engine lubricant supply. This may occur in accordance with a schedule or on demand, for example in the event that lubricant levels in the lubricant reservoir 210 drop below a threshold. The lubricant from the engine lubricant supply may pass through a valve assembly 410 that is configured to allow fluid flow only in the direction from the engine lubricant supply to the lubricant reservoir 210, and not in the direction from the lubricant reservoir 210 to the engine lubricant supply. The valve assembly 410 may comprise two or more one way valves in series, each configured to allow fluid flow only in the direction from the engine lubricant supply to the lubricant reservoir 210, and not in the direction from the lubricant reservoir 210 to the engine lubricant supply. This may provide redundancy; in the event that one of the one way valves fails, the other one way valve will still prevent backflow. The valve assembly 410 may comprise any feature or features that prevent backflow.

Figure 6:
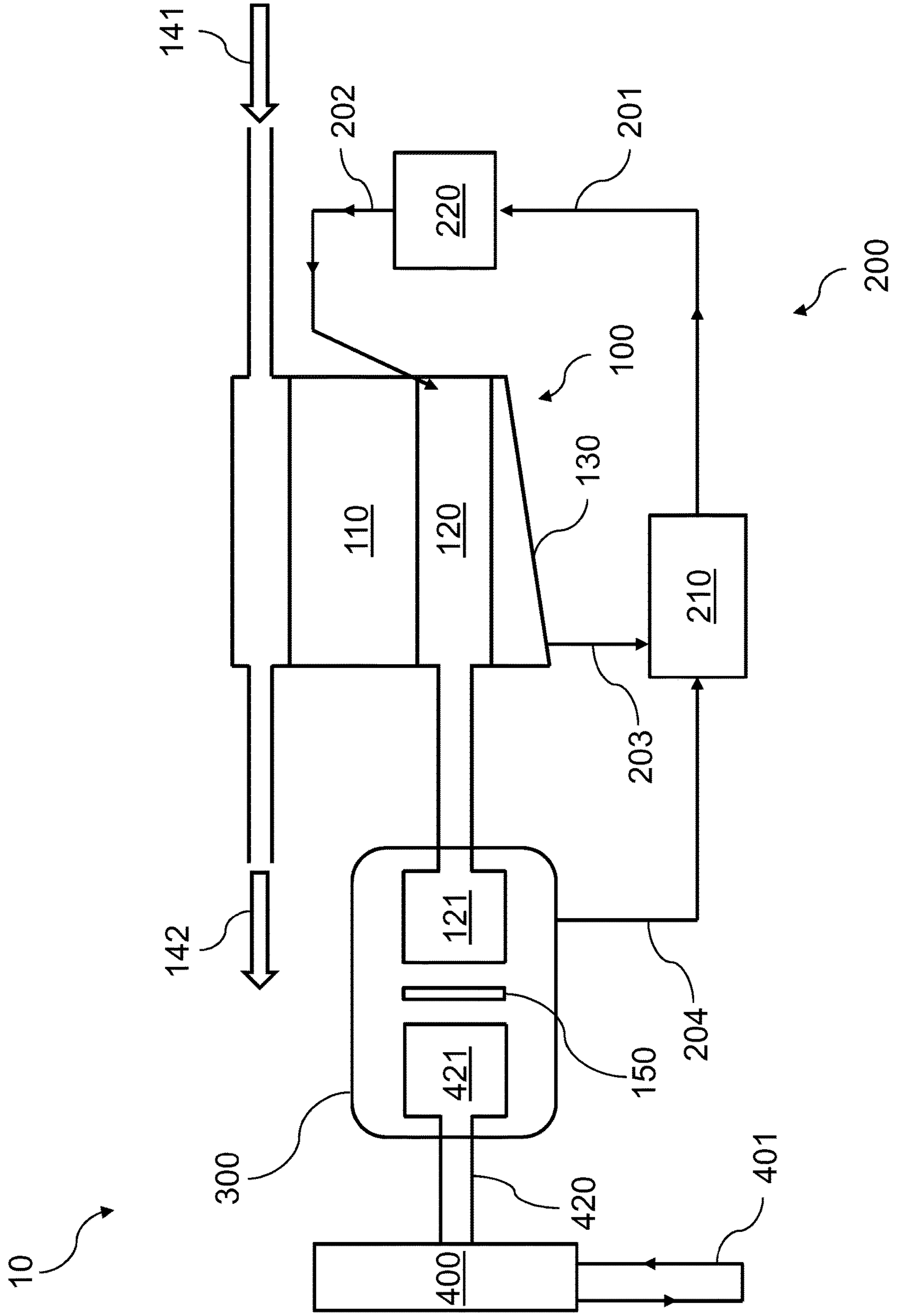
FIG. 6 shows a schematic of a high pressure fuel pump and pump lubrication circuit wherein the pump drive shaft of the fuel pump is mechanically coupled to the engine shaft, in accordance with an embodiment of the disclosure.

In an embodiment, the pump drive shaft 120 may be an end of an engine shaft, such as a power take-off shaft. With reference to FIG. 6, in another embodiment the pump drive shaft 120 may be mechanically coupled to an engine shaft 420, such as a power take-off shaft, such that the engine 400 mechanically drives the pump drive shaft 120. The first portion 121 of the pump drive shaft 120 may comprise a first end of the pump drive shaft 120 that is mechanically coupled to a first end 421 of an engine shaft 420, such as a power take-off shaft, via a mechanical coupling 150. The first end of the pump drive shaft 120 and the first end 421 of the engine shaft 420 protrude into the sealed enclosure 300. The sealed enclosure 300 and the mechanical coupling 150 may be configured to prevent fluid transfer from the first end of the pump drive shaft 120 to the engine shaft 420, such that said fluid is prevented from reaching the engine 400.

Figure 7:
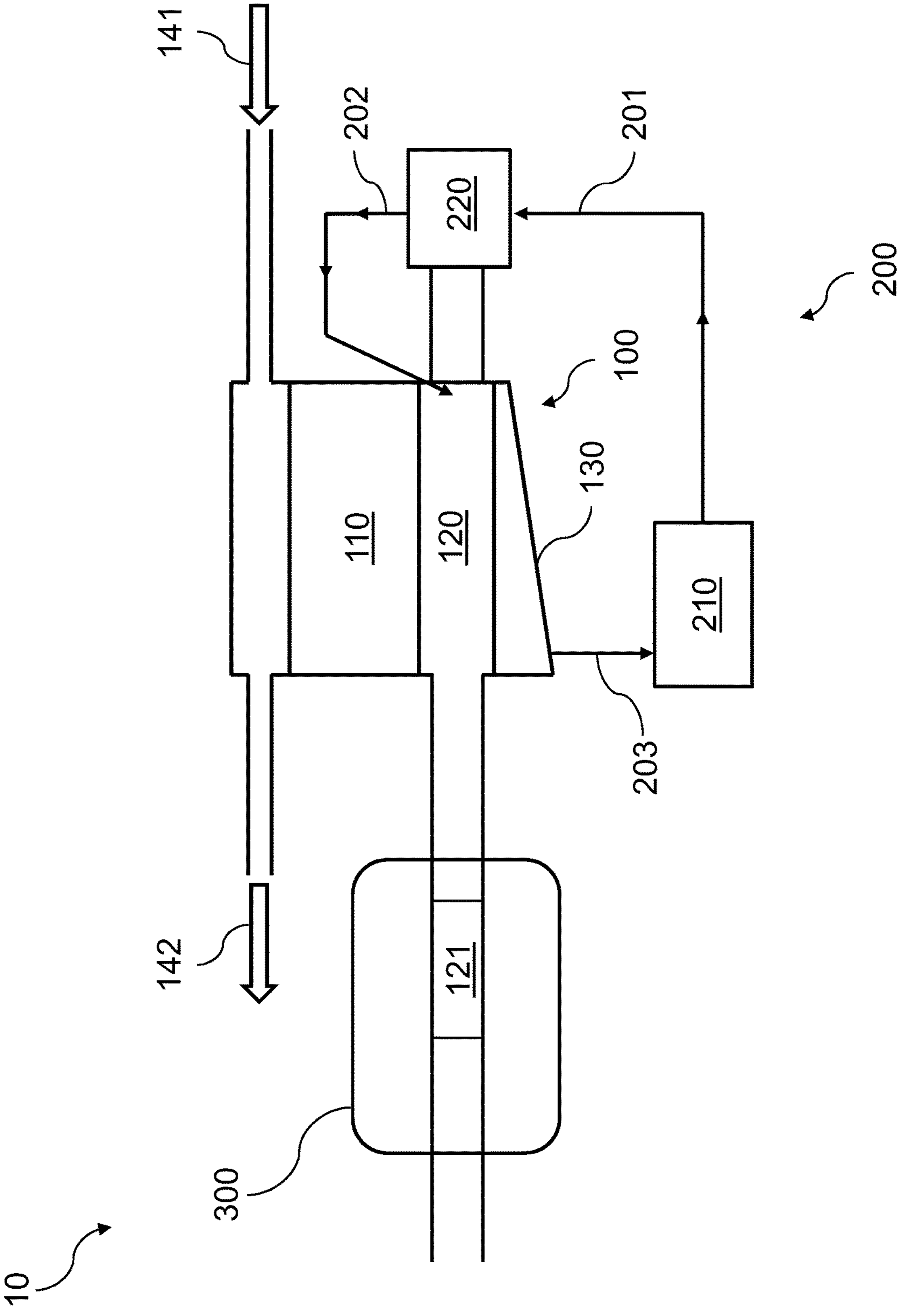
FIG. 7 shows a schematic of a high pressure fuel pump and pump lubrication circuit wherein the lubricant pump is mechanically driven by the pump drive shaft of the fuel pump, in accordance with an embodiment of the disclosure.

In an embodiment the lubricant pump 220 may be an electrically driven pump. In another embodiment, with reference to FIG. 7, the lubricant pump 220 may be mechanically driven by a second end of the pump drive shaft 120 wherein the second end of the pump drive shaft 120 is the free end of the pump drive shaft 120.

Figure 8:
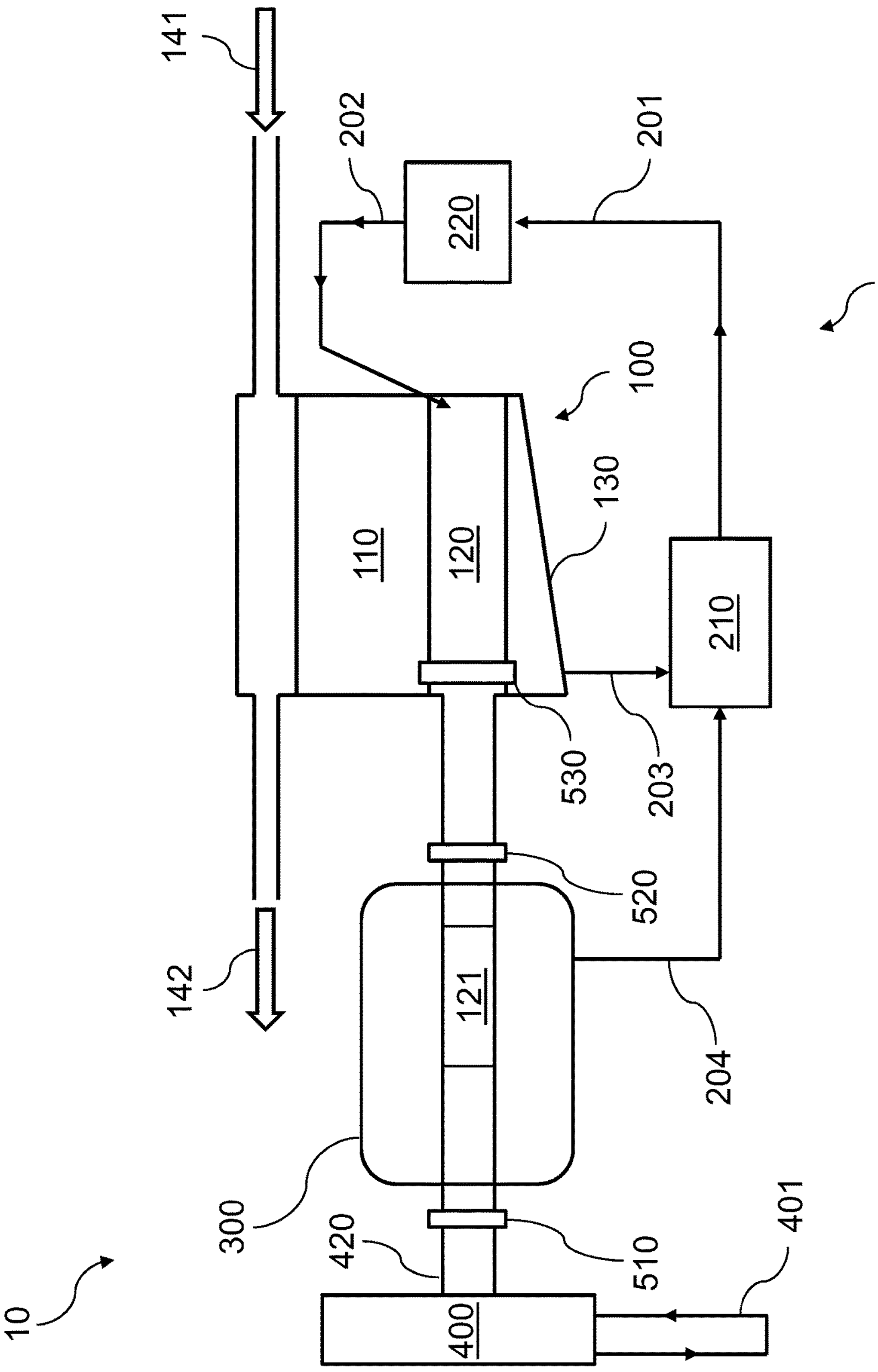
FIG. 8 shows a schematic of a high pressure fuel pump and pump lubrication circuit further comprising shaft seals, in accordance with an embodiment of the disclosure.

The fuel pump 100, pump lubrication circuit 200 and engine shaft 420 may further comprise one or more shaft seals. With reference to FIG. 8, there may be first and second shaft seals 510 and 520 around the pump drive shaft 120 and the engine shaft 420 respectively, exterior to the sealed enclosure 300. There may also be a third shaft seal 530 around the pump drive shaft 120 within the fuel pump 100. The fuel pump 100 may further comprise a drain from one or more bearings of the pump drive shaft 120, configured to drain fluid from the pump drive shaft 120 to the lubricant reservoir 210.

In exemplary embodiments, the fuel pump 100 may be a positive displacement pump. The pump drive shaft 120 may comprise a camshaft or a plunger drive mechanical system. The fuel pumping section 110 may comprise a piston or plunger pump that may be inline, radial or axial. The engine shaft 420 may be a power take-off (PTO) shaft. Alternatively, an engine crankshaft may indirectly drive the pump drive shaft 120. For example, the engine crankshaft may engage drive lines, belt drives or gears.

In use, lubricant reservoir 210 contains lubricant for lubrication of the fuel pump 100. The lubricant pump 220 receives lubricant from the lubricant reservoir 210, and pumps lubricant to the pump drive shaft 120 of the fuel pump 100. The lubricant lubricates the pump drive shaft 120 and the plunger drive mechanical system, and is then drained via lubricant outlet 130 to the lubricant reservoir 210. The pump drive shaft 120 is configured to be mechanically driven. Lubricant may seep past plane bearings in the fuel pump 100 from a section of the pump drive shaft 120 within the fuel pump 100 to a section of the pump drive shaft 120 exterior to the fuel pump 100. A sealed enclosure 300 surrounds a first portion 121 of the pump drive shaft 120, and is configured to prevent or contain leakage of lubricant from the fuel pump 100 via the pump drive shaft 120. In an embodiment, the fuel pump 100 is mechanically driven by an engine 400 and the sealed enclosure 300 is configured to prevent transfer of lubricant from the fuel pump 100 to the engine 400 along the pump drive shaft 120. The sealed enclosure 300 may comprise a drain via which any lubricant that enters the sealed enclosure 300 is drained and returned to the lubricant reservoir 210. The sealed enclosure 300 may be monitored as a leak detection measure.

In an embodiment, the lubricant may be cooled in the pump lubrication circuit 200.

The invention claimed is:

1. A lubricated high pressure fuel pump assembly comprising:

- a fuel pump including a pump drive shaft via which the fuel pump is configured to be mechanically driven;
- a sealed enclosure configured to surround a first portion of the pump drive shaft, wherein the first portion is exterior to the fuel pump, the sealed enclosure including a feature configured to monitor fluid entry into the sealed enclosure; and
- a pump lubrication circuit comprising:
  - a lubricant reservoir; and
  - a lubricant pump configured to pump lubricant from the lubricant reservoir to the pump drive shaft;

wherein:

- the sealed enclosure is configured to prevent fluid leakage from the fuel pump via the first portion of the pump drive shaft; and
- the lubricant reservoir is configured to collect the lubricant from the pump drive shaft;
- such that the lubricant is retained within the lubricated high pressure fuel pump assembly.

2. The lubricated high pressure fuel pump assembly of claim 1 wherein the first portion of the pump drive shaft is a first end of the pump drive shaft and wherein the first end protrudes into the sealed enclosure.

3. The lubricated high pressure fuel pump assembly of claim 2, wherein the first end of the pump drive shaft is configured to mechanically couple to an engine shaft via a mechanical coupling and wherein the sealed enclosure is configured to surround the mechanical coupling and, in use, a first end of the engine shaft.

4. The lubricated high pressure fuel pump assembly of claim 1 wherein the lubricant reservoir is configured to receive lubricant from an engine lubricant supply.

5. The lubricated high pressure fuel pump assembly of claim 4 further comprising a first one way valve assembly configured to receive the lubricant from the engine lubricant supply and output the lubricant to the lubricant reservoir and to prevent lubricant from flowing from the lubricant reservoir to the engine lubricant supply.

6. The lubricated high pressure fuel pump assembly of claim 5 wherein the one way valve assembly comprises a first one way valve and a second one way valve in series and with the same forward direction.

7. The lubricated high pressure fuel pump assembly of claim 1 further comprising a fluid separator configured to:

- receive a first fluid from the lubricant reservoir;
- separate the first fluid into lubricant and a second fluid; and
- output the lubricant to the lubricant pump.

8. The lubricated high pressure fuel pump assembly of claim 7, wherein the second fluid is fuel.

9. The lubricated high pressure fuel pump assembly of claim 8, wherein the fuel is a low flash point fuel.

10. The lubricated high pressure fuel pump assembly of claim 9, wherein the low flash point fuel is one of methanol or dimethyl ether.

11. The lubricated high pressure fuel pump assembly of claim 1 wherein the lubricant pump is mechanically driven by a second end of the pump drive shaft.

12. The lubricated high pressure fuel pump assembly of claim 1 wherein the lubricant pump is electrically driven.

13. An engine assembly comprising:

- an engine configured to combust low flash point fuel; and
- a lubricated high pressure fuel pump assembly of any preceding claim.

14. The lubricated high pressure fuel pump assembly of claim 13 wherein the pump drive shaft is mechanically coupled to an engine shaft at the first portion of the pump drive shaft.

15. The lubricated high pressure fuel pump assembly of claim 13 wherein the pump drive shaft is an engine shaft end.

* * * * *